June 25, 1940. J. MUROS 2,205,905
SHAVING IMPLEMENT
Filed April 16, 1936 2 Sheets-Sheet 1
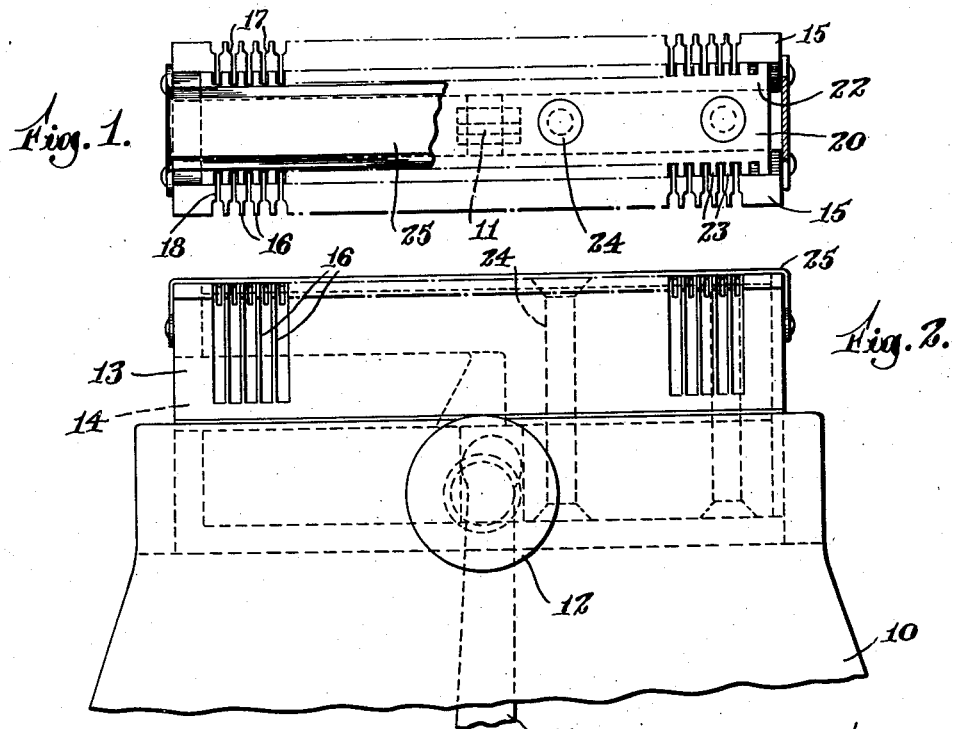
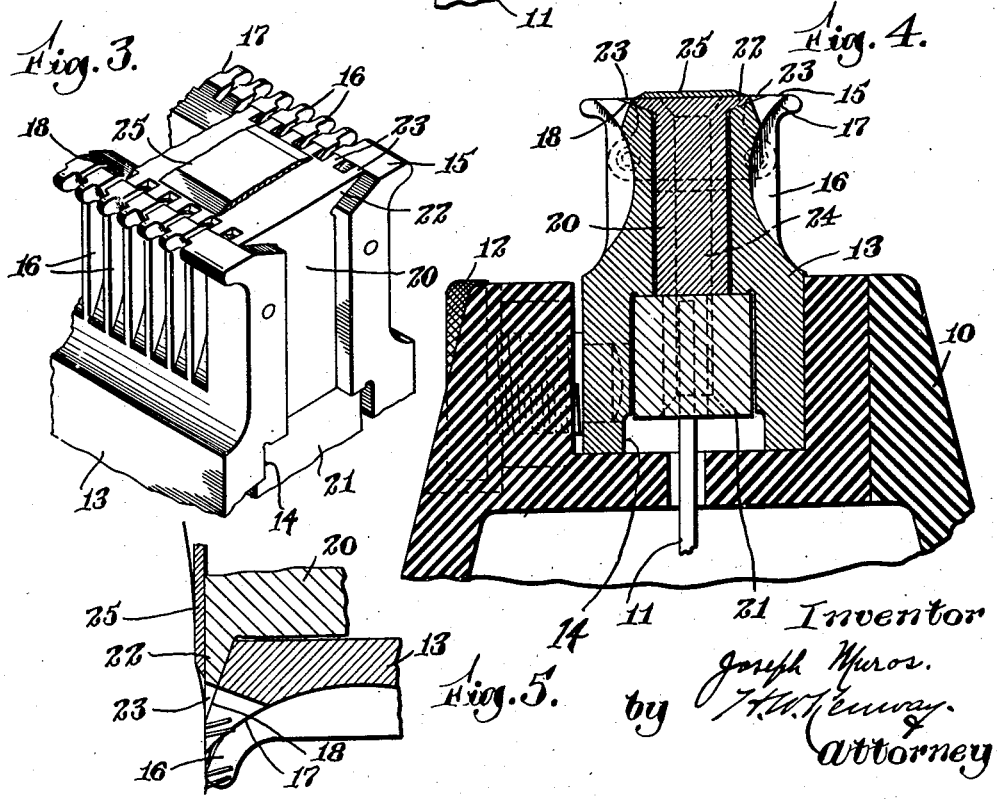
Inventor
Joseph Muros.
by F. W. Tenney.
Attorney June 25, 1940.  J. MUROS  2,205,905
SHAVING IMPLEMENT
Filed April 16, 1936  2 Sheets—Sheet 2
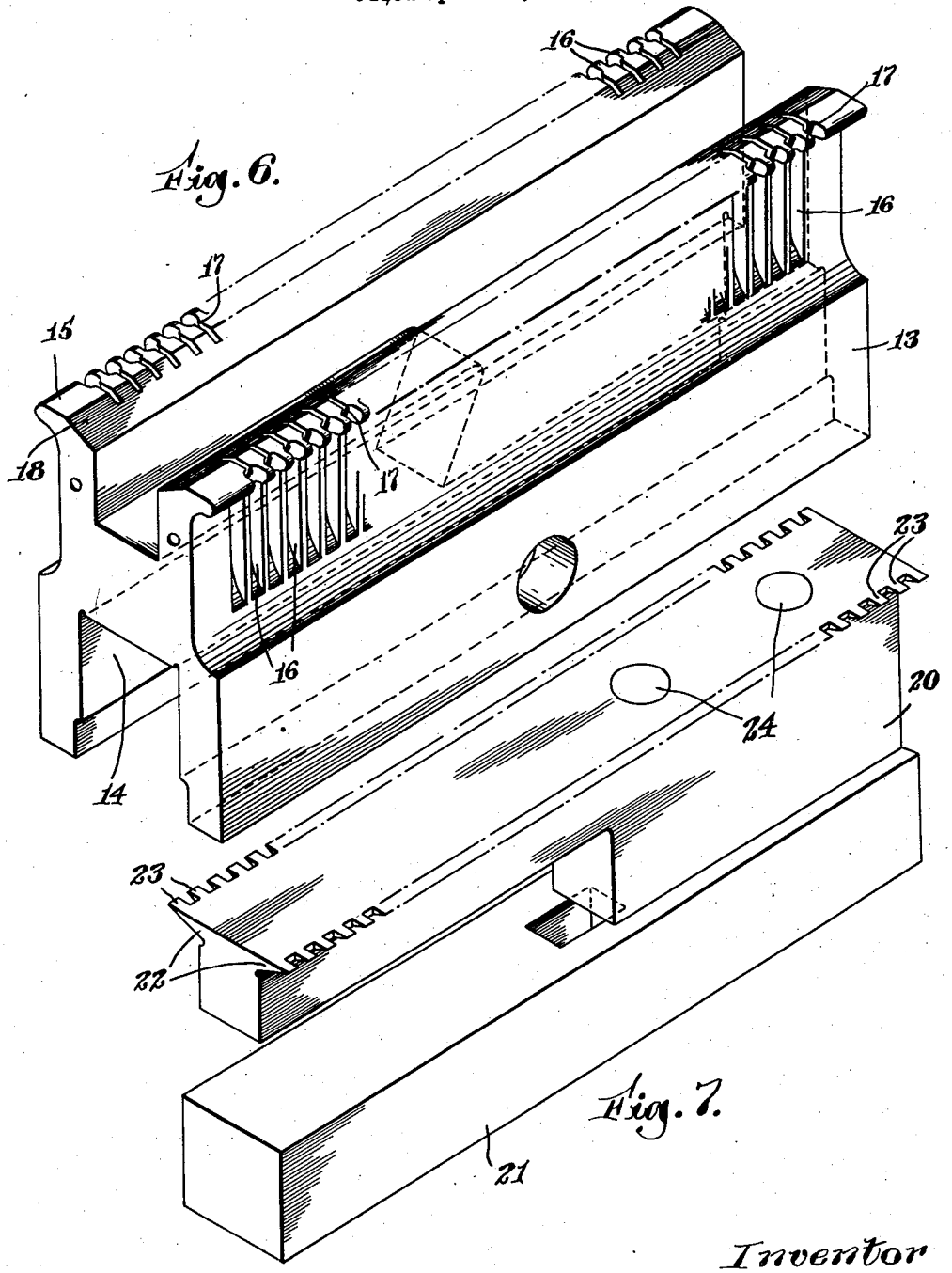

Patented June 25, 1940

2,205,905

UNITED STATES PATENT OFFICE 2,205,905

SHAVING IMPLEMENT

Joseph Muros, Cambridge, Mass., assignor to Gillette Safety Razor Company, Boston, Mass., a corporation of Delaware Application April 16, 1936, Serial No. 74,701

5 Claims. (Cl. 30—43)

This invention relates to shaving implements of the vibrating shear type employed for shaving without the use of lather. It comprises an implement so organized that it may be given operating movements in opposite directions upon the face of the user, thus improving the speed of shaving and convenience in use of implements of this type as compared to those heretofore available. The desired results are secured, as herein shown, by providing a series of stationary shearing teeth directed outwardly on each edge of the implement and a movable shearing member arranged to co-operate with both series of teeth. The resulting implement may be considered to be of the duplex type in that it has a complete operative shearing unit or mechanism oppositely directed on each of its outer edges, each being operative when advanced over the face of the user. The combination in a shaving implement of two separate and stationary series of shearing teeth having a single common co-operating shear member with teeth tapering to a thin edge has not heretofore been known or used and is believed to be broadly new.

Another feature of the invention consists in a stationary guard block constructed and arranged to serve as a housing for a movable shearing member and having a portion thereof shaped to provide the oppositely directed series of shearing teeth. It is believed that a guard member having these different functions combined therein has not heretofore been known in this type of implement.

Other features of the invention reside in various features of mechanical construction which are not necessarily limited to shaving implements of the duplex type but which may be usefully embodied in any dry shaving implement. For example, the stationary shearing teeth are herein shown as formed in outwardly directed flanges forming a part of the guard block and the grooves which separate the individual teeth of the series are herein shown as extended into the body of the guard block where they act as waste passage permitting the shaving waste immediately to leave the shearing zone and thus avoid a tendency to clog the shearing teeth.

These and other features of the invention will be best understood and appreciated from the following description of a preferred embodiment thereof, selected for purposes of illustration and shown in the accompanying drawings, in which—

Fig. 1 is a plan view of the device on a greatly enlarged scale, showing a portion of the retaining plate broken away;

Fig. 2 is a corresponding view in side elevation, the casing being shown as broken away;

Fig. 3 is a fragmentary view in perspective on a still larger scale;

Fig. 4 is a view in cross-section on the same scale as Fig. 3;

Fig. 5 is a fragmentary sectional view on a still larger scale;

Fig. 6 is a view in perspective of the guard block; and

Fig. 7 is a corresponding view of the slide member.

The implement includes a combined casing and handle 10 in which is housed a small motor, not shown, and this is connected to an operating lever 11 in such manner as to oscillate it rapidly. This movement of the lever 11 is utilized to reciprocate the slide member of the implement as will be presently explained.

The casing 10 is provided in its end with a socket in which is detachably mounted an elongated duplex guard member or block 13, the latter being retained in place by a thumb screw 12 which is threaded into one wall of the socket in the casing. The block 13 is provided in its lower face with a longitudinal chamber 14 and has in its upper face an open, centrally disposed channel bounded in part by outwardly directed flanges 15. The flanges 15 are divided into two series of teeth 16 by narrow transverse slots which pass through them but do not extend through the vertical walls of the channel. The channel has at its upper edges inclined, outwardly diverging walls forming the bevelled faces 18. The slots forming the teeth extend through these bevelled faces 18 in the block 13 and it is the edges thus formed which act as shearing teeth. The bevelled faces 18 merge into flat horizontally disposed faces and these in turn merge into narrow integral rounded guard teeth. Each guard tooth 16 is provided on both sides with an inclined shoulder 17 which terminates in a lifting blade. These lifting blades have the function of lifting and moving the hairs into upright position as the implement is advanced over the face of the user so that the hairs may arrive in shearing location in the best position for close shaving, as suggested in Fig. 5. The slots which form between them the individual guard teeth 16 are extended downwardly in the sides of the block 13 forming spaced fins. The slots thus form clearance passages so that the shaving waste may pass directly away from the shearing teeth without tendency of clogging them. It will be understood that the slots correspond to the spacing of the outer ends of the guard teeth 16 and that the width of the shearing teeth is considerably greater.

The block 13 is provided in its lower face with an elongated chamber or passage 14 as already noted. The channel and chamber are separated throughout a portion of the length of the block 13 by a horizontal partition shown in Figs. 1 and 6. A slide member is mounted for limited reciprocation in the block 13. As shown in Fig. 7 this member comprises an upper portion or bar 20 and a slightly wider base portion 21, the two being permanently secured together by rivets 24. The base portion is arranged to slide freely in the lower passage 14 of the block 13. The bar 20 has at its opposite edges flanges 22 merging into its upper face. The flanges are defined by outwardly bevelled surfaces which are shaped to rest upon the bevelled faces 18 of the block member and terminate within the flat faces of the teeth 16. The slide member is thus accurately positioned and supported by the action of the co-operating divergent faces. The only other bearing faces between these two members are provided by the shoulders formed by the upper surface of the base portion 21. As clearly shown in Fig. 4 these two pairs of surfaces are arranged to make a sliding fit with each other and the vertical walls of the slide member clear the inner walls of the block 13 thus reducing friction in the moving parts to a minimum. The flanges 22 of the slide member are provided with shearing teeth 23, the latter being spaced from each other by slots or notches slightly wider than the slots separating the shearing teeth in the inclined faces 18 of the block.

The dimensions of the shearing teeth may be varied within a wide range but it is preferred to make the teeth of the reciprocatory slide rather narrow as compared to their depth since this makes the operation of the implement smoother on the face of the user. For example, the teeth may be made .016 in width, .016 in spacing and .008 in depth with very good results.

The slide member is retained in place within the block 13 by a thin bevelled-edge metal strap 25 which is secured at each of its ends by rivets to the ends of the block 13 and extend upwardly across the upper face of the slide 20. The edges of the strap 25 are bevelled outwardly and divergently toward the zone of shearing.

In using the ilustrated implement the operating lever 11 is set in rapid vibration and then the upper face of the guard member is advanced slowly over the face of the user. Under these circumstances the hairs are directed into the spaces between the guard teeth 16, being directed by the lifting shoulders 17 into the spaces between the shearing teeth. The vibration of the slide is effective to sever them and as the implement moves along the waste falls down between the fins and out of the implement. The same action is repeated when the implement is moved in the opposite direction over the face of the user and very rapid and effective shaving is produced by moving the implement back and forth cutting first with the shearing teeth on one edge and then with the shearing teeth on the other edge.

The action of the razor on the face is particularly smooth since all parts of the movable cutter are guarded from contact. The flat upper surface of the slide 20 is guarded by the stationary bevelled strap 25 and the ends of the movable shearing teeth are guarded by the stationary guard teeth formed in the flange portion of the block 13.

Having thus described my invention what I claim as new and desire to secure by Letters Patent of the United States is:

1. A shaving implement having upper and lower longitudinal passages therein and a series of shearing teeth located adjacent to the upper passage, a reciprocatory member having spaced and rigidly connected portions arranged to slide in said passages and co-operating shearing teeth formed in the upper portion of said member, and operating means connected to the lower portion of said member.

2. A shaving implement including an elongated block having an open channel in its upper face, outwardly directed flanges adjacent thereto and shearing teeth provided in said flanges, the block having also a longitudinal passage communicating with said channel, and a reciprocatory member comprising an upper tooth-bearing portion disposed in said channel and a connected lower portion disposed in said longitudinal passage.

3. A shaving implement including an elongated member having a central channel and shearing teeth on its opposite edges, each tooth having a guard extension, an intermediate slide member movable in said channel and having oppositely directed teeth co-operating with the teeth of said member, and a thin sheet metal retaining member arranged to overlie the body of said slide member between the guard extensions.

4. A shaving implement including an elongated block having outwardly directed shearing teeth along both of its edges, a co-operating slide forming a flush surface with the top of said block, and a bevelled edge strap engaging the face of said slide.

5. A shaving implement comprising a block outwardly flanged along its opposite edges and slotted to provide a series of shearing teeth in each flange, each tooth having a rounded guard extension of reduced thickness at its outer end, and a toothed slide presenting shearing teeth co-operating with the teeth of both flanges.

JOSEPH MUROS.